Patented Jan. 1, 1929.

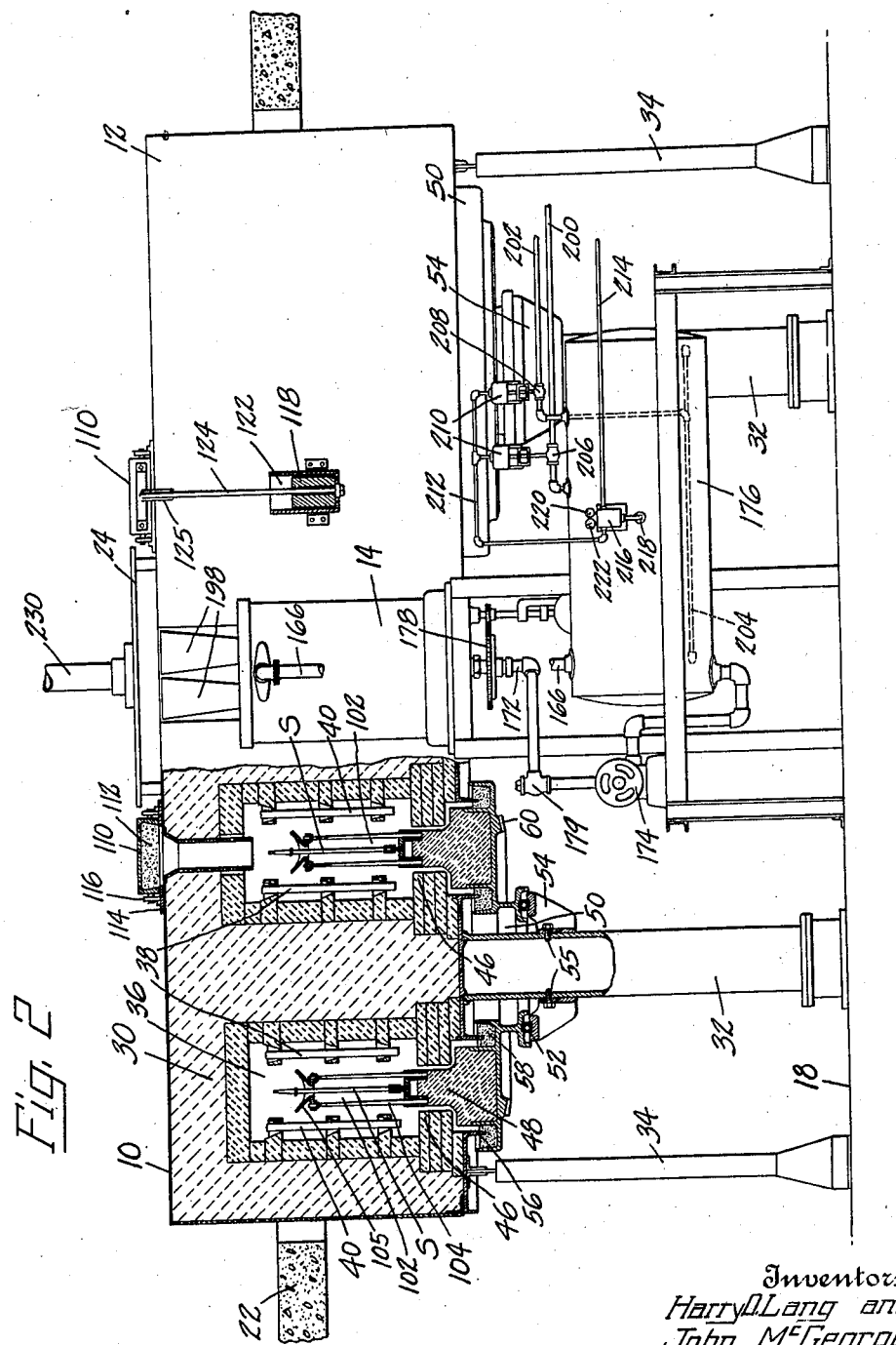

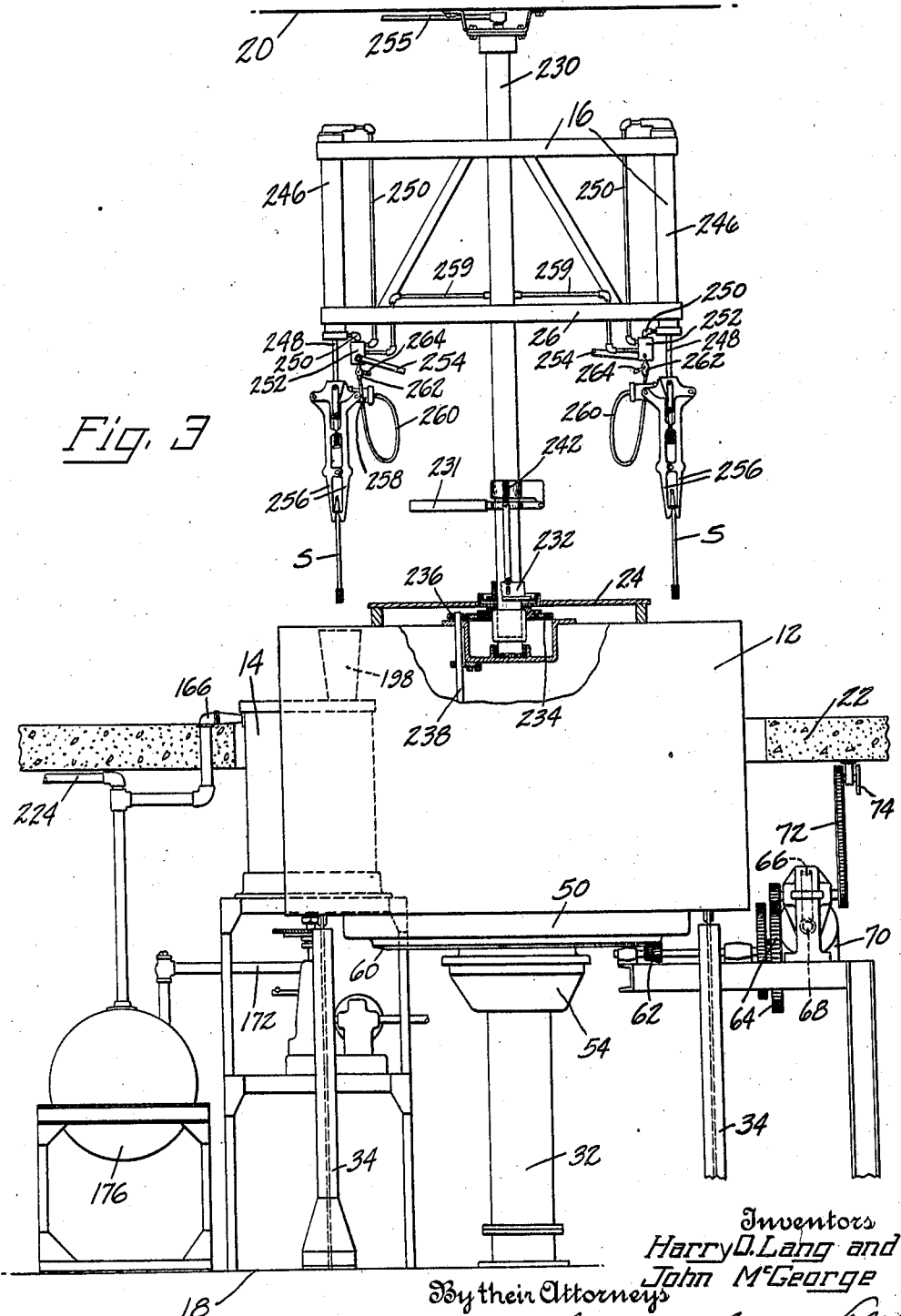

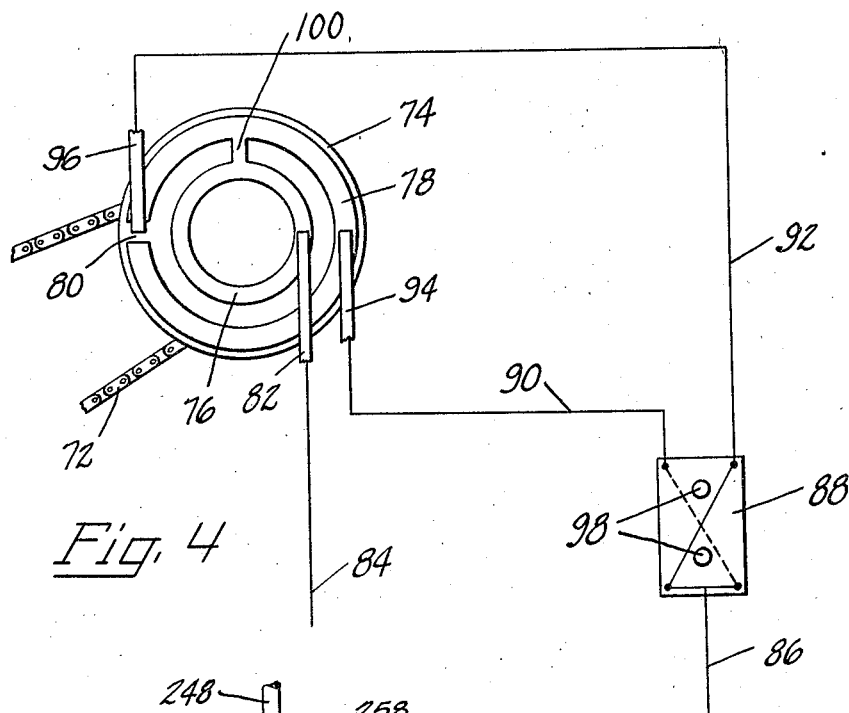
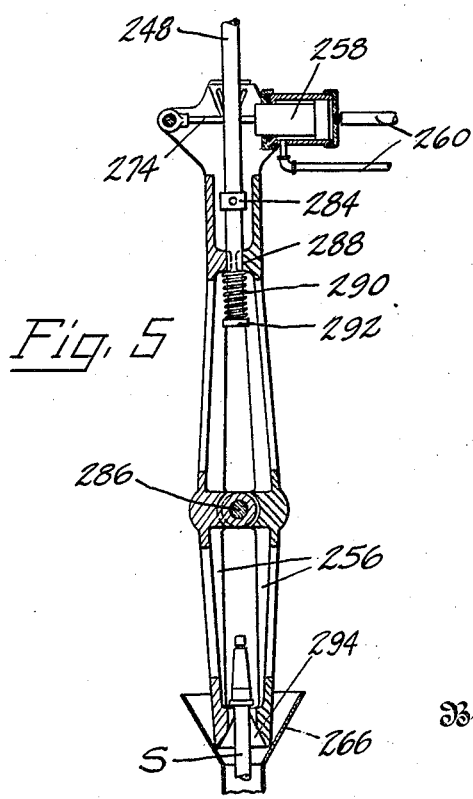
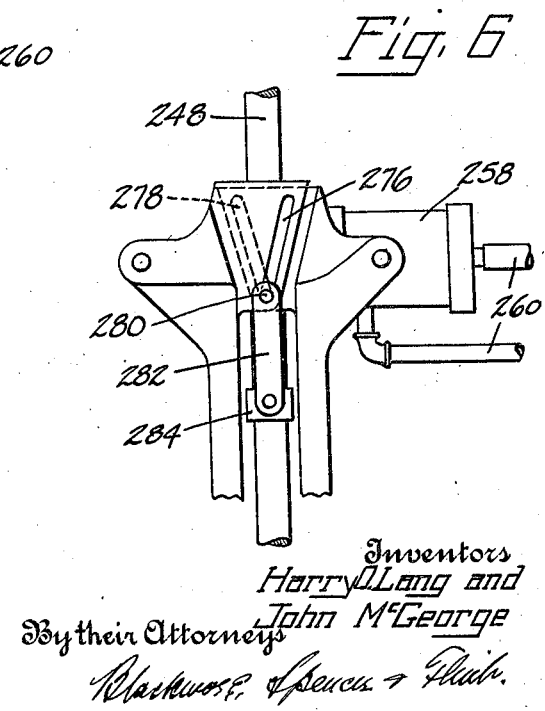

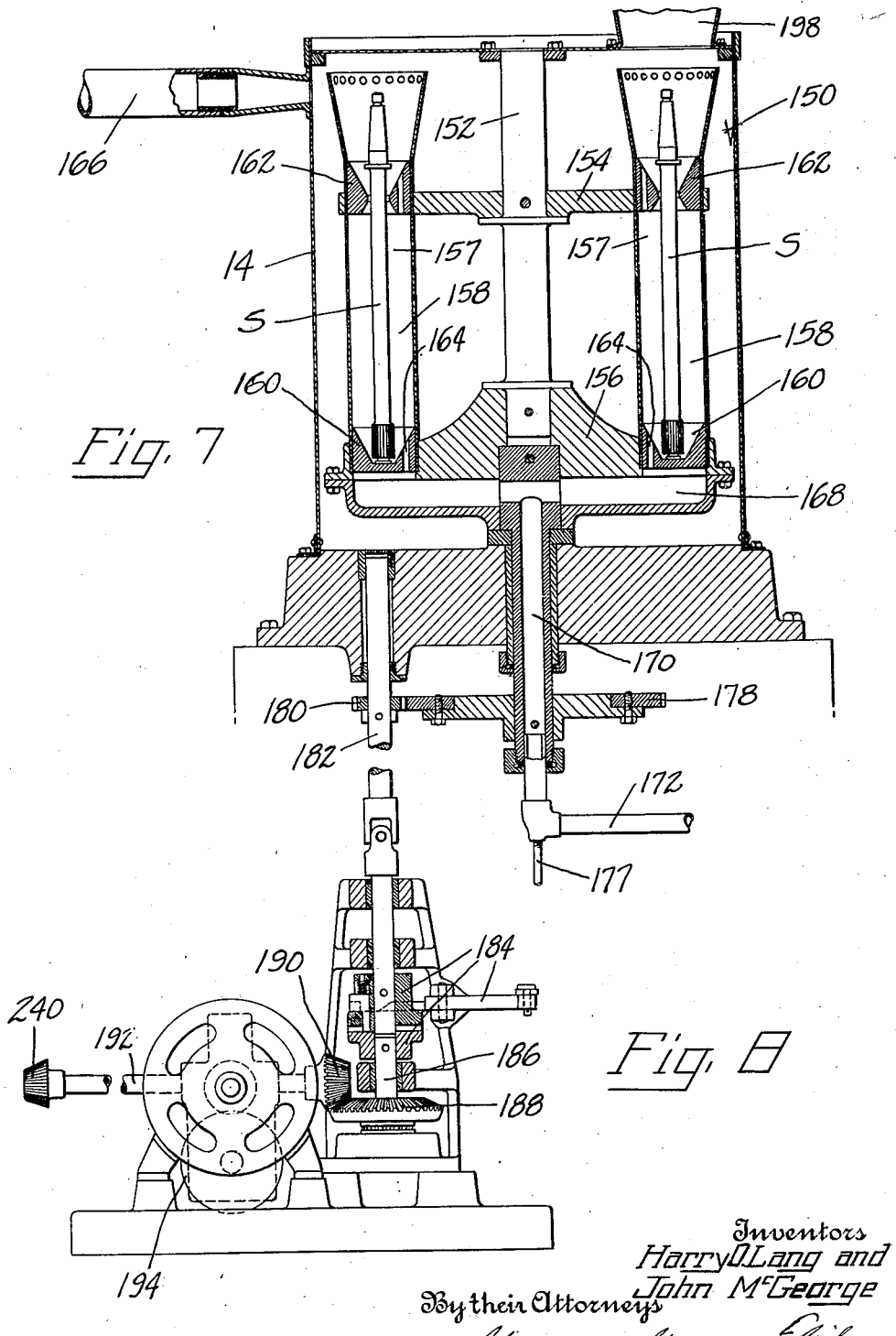

1,697,820

UNITED STATES PATENT OFFICE.

HARRY O. LANG AND JOHN McGEORGE, OF PONTIAC, MICHIGAN, ASSIGNORS TO GENERAL MOTORS CORPORATION, OF DETROIT, MICHIGAN, A CORPORATION OF DELAWARE.

SHAFT-TREATING APPARATUS.

Application filed May 2, 1924. Serial No. 710,685.

This invention relates to shaft treating apparatus and is illustrated as embodied in apparatus for hardening and drawing straight shafts and similar long and thin objects, shown as the axle sections used as driving connections between the differential of an automobile and the opposite rear wheels.

An object of the invention is to provide mechanism for handling such shafts, etc., in a constantly vertical position so that they will not become warped or otherwise lose shape when they are heated, as is not unusual when the shafts are kept in a horizontal position. Preferably, this is accomplished by power mechanism including shaft handling devices which are controlled by an operator, but which can handle the shafts when they are at a temperature too high for easy manual handling. In one desirable arrangement, a hardening furnace, a quenching tank, and a drawing furnace are provided with charging and discharging openings arranged substantially on the circumference of a circle, and a circularly-movable operator-controlled conveyor is arranged for transferring the shafts in a vertical position successively to positions vertically above the openings of the hardening furnace, the quenching tank, and the drawing furnace. In the embodiment shown in the drawings, this conveyor includes novel power-operated tongs for grasping and raising and lowering the shafts, and for centering the shafts.

Another feature of the invention relates to an improved electrical furnace especially adapted for use wtih apparatus such as described above and which includes concentric series of resistance elements between which the shafts are slowly moved by a turret or movable hearth, which supports them in a vertical position. The shafts may be inserted into and removed from the furnace through openings vertically above shaft-supporting devices on the turret when the turret is at rest. By this arrangement the shafts are efficiently heated by resistance elements which are quite close to them and there is no tendency for warping since the shafts are held in a vertical position. A further advantage of this construction is that the resistance elements and the shafts supported on the turret may be almost completely enclosed with refractory material so that there is practically no loss of heat.

The quenching tank may also be provided, if desired, with a turret for supporting the shafts while they are carried around from a charging position to a discharging position, and various features of the invention relate to the novel construction of this quenching tank to provide efficient cooling of the shafts by constantly circulated water which is maintained at a uniform temperature, and especially to an arrangement for giving the water a helical or whirling motion, to insure a uniform cooling action.

The above and other objects and features of the invention, including various novel combinations of parts and desirable particular constructions, will be apparent from the following description of the illustrative embodiment shown in the accompanying drawings, in which:

Figure 2 is a view partly in side elevation, and partly in vertical section, on the line 2—2 of Figure 1, and looking from the left in Figure 1;

Figure 3 is an end elevation, partly broken away, looking from the bottom of the sheet upwardly in Figure 1 and showing the relation of the drawing furnace to the conveyor;

Figure 4 is a wiring diagram showing the stopping and starting control for one of the furnaces;

Figure 5 is a vertical section through one of the tongs or shaft-carrying devices as it is grasping an untreated shaft;

Figure 6 is a side elevation of the top of the tongs, on a larger scale than Figure 5;

Figure 7 is a vertical section on the line 7—7 of Figure 1 showing the quenching tank; and Figure 8 is a vertical section through the driving mechanism for the quenching tank with the central shaft in alinement with the part of the same shaft shown in Figure 7, but looking in the opposite direction from Figure 7, i. e. looking in the opposite direction from the arrows 7—7 in Figure 1.

Figure 1:
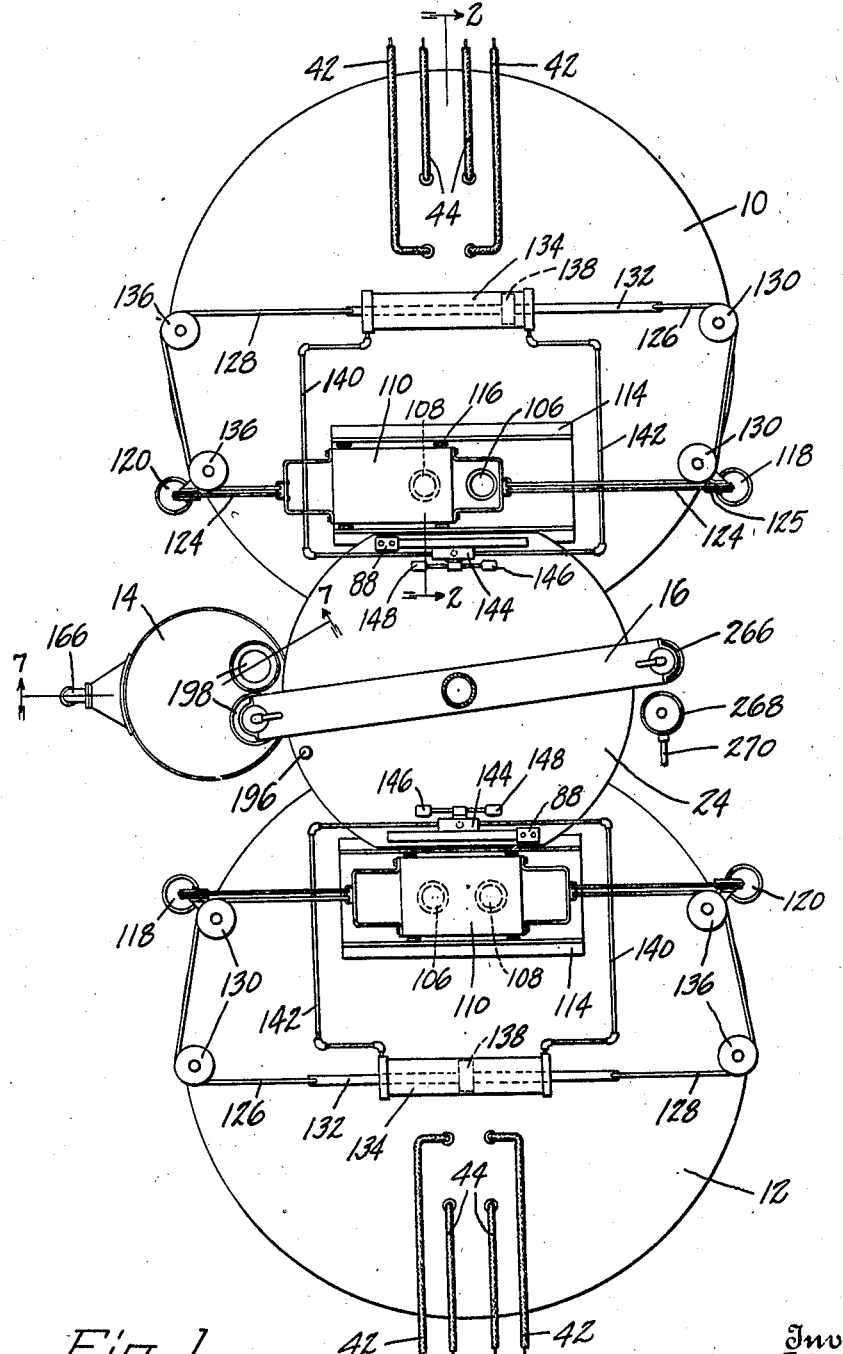
Figure 1 is a top plan view showing the two furances and the quenching tank, together with the conveyor.

The invention is shown in these drawings embodied in an apparatus including generally a hardening furnace 10 electrically heated to from 1480° to 1525° F., a drawing furnace 12 which is exactly like the hardening furnace 10 except that it is only heated to a temperature of only 890° to 1000° F., a quenching tank 14 containing water automatically kept at a temperature of about 190° F. and a rotary conveyor 16 for placing the shafts successively in the hardening furnace, the quenching tank, and the drawing furnace. The apparatus is shown as occupying two floors of a building, extending from the floor 18 of the basement of the building to the ceiling 20 of the first floor so that the furnaces 10 and 12 and the quenching tank 14 extend just above the intermediate floor 22. Just below the conveyor 16 is a circular platform 24 for the operator or operators. Figures 1, 2, and 3, are on approximately the same scale and in order to give a general idea of the size of the various parts it may be stated that the distance from the platform 24 to the lower cross piece 26 (Figure 3) of the conveyor 16 is approximately 7 feet. It is intended that one operator, or an operator at each end of the conveyor 16, as may be desired, will walk round and round on the platform 24 as the conveyor transfers the shafts from one position to another as it turns.

*The hardening and drawing furnaces.—* The hardening furnace 10 and the drawing furnace 12 may be, and are shown as being, identical except that the one is turned around 180° with respect to the other and except that the hardening furnace is maintained at a higher temperature than the drawing furnace. Each of these furnaces comprises a stationary casing 30 of refractory material, such as fire brick or the like sheathed in sheet steel, supported from the floor 18 of the basement on a central column 32 shown as being of refractory material enclosed in a metal sheathing and on a plurality of legs 34 shown as being made of metal sheathed in cement. The column 32 supports the central column-like part of casing 30, while the legs 34 support the outer annular wall. Each of the furnaces is arranged to provide an annular open space 36 between concentric series of resistance elements 38 and 40. Current is supplied to the resistance elements 38 by conductors 42 and to the resistance elements 40 by conductors 44. A suitable automatic heat registering and recording device, including a pyrometer and a circuit controlled thereby, may if desired be provided for keeping track of the temperature in the furnace; and it is also convenient to provide automatic means of well known character for controlling elements 38 and 40 to give a substantially uniform temperature.

The bottom of the annular open space 36 in each furnace, is partially closed by rings 46 of refractory material which leave a central circular opening in which is arranged an upwardly projecting annular portion 48 of a turret or movable hearth 50 supported on ball bearings 52 on a track 54 carried by the central column 32. To prevent the escape of heated air from the space 36 in the furnace the metal bottom of the furnace is provided with flanges 56 projecting into sand in annular pockets 58 carried by the turret as shown in Figure 2 in such a manner as to seal the open space. Each track 54 is clamped to its column 32 by clamp screws 55. By loosening the screws, the track 54, and with it the turret 50, may be lowered to the bottom of column 32, thus affording easy access to the annular chamber 36, and to the parts of the turret 50. If desired, filling tubes for adding sand may open through the top of the furnace, and empty just above each of the annular pockets 58 of the turret. Each of the turrets 50 is formed with a bevel ring gear 60 on its bottom driven by a bevel pinion 62 operated by reduction gearing 64 from a shaft carrying a worm wheel 66 driven by a worm 68 on the armature shaft of a motor 70, each of the furnaces being provided with its own motor.

The shaft carrying the worm wheel 66 may also carry a sprocket driving a chain 72 which operates a circuit controlling device 74 shown on a large scale in Figure 4. This circuit controlling device is formed with an endless inner slip ring 76 and with an outer slip ring 78 provided with a break or insulated portion 80. A single brush 82 attached to the supply line 84 is in constant engagement with the inner slip ring 76. The conductor 86 leading to the motor 70 is connected through a two-way switch 88 to one of two conductors 90 or 92 in communication with brushes 94 and 96, respectively. The brushes 94 and 96 are both arranged to engage the slip ring 78 at points spaced 180° apart. The two-way switch 88 is operated in the usual way by depressing one or the other of the plungers 98 to connect the conductor 86 alternately with the brush 94 and with the brush 96. The circuit is completed by a connection 100 between the slip ring 76 and the slip ring 78.

In the positions of the parts shown in Figure 4 the conductor 86 is connected to the brush 96 which is resting on the break or insulated portion 80 and consequently the motor 70 is not running. By depressing the proper plunger 98 the conductor 86 is connected to the brush 94 whereupon the motor 70, and therefore the turret 50, will be driven until the break 80 reaches the brush 94, that is, until the device 74 has turned 180°. If now the opposite plunger 98 is depressed to place the conductor 86 once more in communication with the brush 96 the motor will again be driven until the device 74 has turned through another arc of 180°. It will be seen that the motor can be driven for twice this period, or until the device 74 has turned through 360°, by depressing both plungers 98 one after the other in quick succession. In the positions shown in Figure 4, for example, when the first plunger is depressed the device 74 will start to turn and the brush 96 will ride into engagement with the slip ring 78 before the other plunger 98 can be depressed to break the current again, while the depression of the second plunger 98 will thereafter throw the circuit back to the brush 96 again so that the circuit will not be broken until the break 80 has travelled 360° back to the brush 96. Thus it is possible to place axle sections in each carrier of the turret 50 when two men are operating the apparatus or only in every alternate carrier when only one man is operating it, or if preferred the one man may place them in each carrier and let them remain in the furnace twice as long as when there are two men.

Each turret 50 carries a plurality of angularly spaced carriers 102 for the shafts, these carriers being spaced apart at such an angle that the turret is advanced a distance equal to an advance of one carrier each time the switch 88 is operated. Each turret shown in the drawings has 64 carriers. Each carrier comprises suitable supports 104 carrying a conical guide or centering device 105 having a central opening through which the shaft S passes, so that the shafts are at all times maintained in a truly vertical position and there is no tendency for them to warp or otherwise change their shape, as when they are treated in a horizontal position.

Each of the furnaces is provided with adjacent charging and discharging openings 106 and 108 respectively, these openings being spaced apart to be immediately above two of the carriers 102 when the turret 50 is at rest. In the arrangement shown, there are four idle carriers between the two openings, so the furnace has a capacity of sixty shafts. Each pair of openings 106 and 108 is normally closed by a cover 110 containing refractory material 112 and movable on a metal track 114 on rollers 116. The cover 110 is normally held in a position to cover both openings 106 and 108 as shown on the furnace 12 in Figure 1 by opposed counter weights 118 and 120. At the time the cover 110 is in this central position the counter weights 118 and 120 rest on cylindrical brackets 122 supported on the sides of the furnace. If the cover is moved in either direction, the opposite counter weight will be lifted from its bracket and will return the cover to its central position as soon as permitted. The counter weights are connected to the cover by cables or chains 124 passing over pulleys 125.

Each cover 110 is connected at its opposite ends to cables or chains 126 and 128. Each cable 126 passes over a pair of pulleys 130 and is connected to one end of a connecting rod 132 which passes through packings in opposite ends of an air cylinder 134. The opposite end of the connecting rod 132 is connected to the cable 128 which is guided by a pair of pulleys 136. Each connecting rod 132 carries a double acting piston 138 in the cylinder 134. Compressed air is admitted to one end or the other of the cylinder 134 through one or the other of two conduits 140 or 142 controlled by an air valve 144 operated in one direction or the other by depression of one or the other of two pedals 146 or 148.

By this arrangement, it will be seen that power is provided, so that the operator may step on the first pedal he comes to, to open the charging opening 106; and after depositing a shaft in the furnace through this opening, he can then step on the further pedal to open the discharging opening 108; while after he removes the shaft through this opening and releases the corresponding pedal the cover will automatically be returned to its neutral position covering both openings by one or the other of the two counter weights 118 or 120. It will also be seen that as soon as he has done this he may depress one or both of the plungers 98 of the switch 88 to cause the turret 50 to advance far enough to be ready for him the next time he comes round.

*The quenching tank.*—The quenching tank 14 is arranged to receive the hot shafts from the hardening furnace 10 and prepare them for insertion in the drawing furnace 12, and to this end it is kept full of clear water at a constant temperature of substantially 190° F. The quenching tank comprises a cylindrical water reservoir or tank proper 150 in which is arranged a turret comprising a central shaft 152 carrying upper and lower arms 154 and 156 on which are arranged shaft carriers 157, each of which consists of a tubular sheet metal guide 158 for the water and a conical lower support 160 for the shaft and an upper conical support or guide 162 for centering the shaft and holding it in a truly vertical position. In order to provide for uniform cooling of the shafts, each of the supports 160 and 162 is formed with water passages 164, arranged at such an angle as to give the entering water a circumferential or centrifugal motion as it passes through the tubular member 158 to the outlet 166 of the tank, and if desired a helical sheet metal water guide (not shown) may be provided. The above described turret is provided with six stations spaced 60° apart, and the lower arms 156 are provided with radial water passages 168 communicating with an axial passage 170 formed in the shaft 152 or in a second shaft secured to the shaft 152 and forming a continuation thereof. The passage 170 receives a continuous supply of water from a pipe 172 through which water is constantly forced by a motor driven pump 174 from a supply tank 176. If desired, steam may be forced into the water through a fitting 177 to agitate the water and cause it to have a more efficient cooling contact with the shafts S, and to cool the shafts more uniformly, although this will not ordinarily be necessary if the pump 174 has sufficient capacity.

The turret inside of the tank 14 is advanced periodically, as the operator inserts a hot shaft and removes a cool one, by a large gear 178 driven by a small gear 180 on a vertical shaft arranged to be connected by a one revolution clutch 184 of any desired form, to a short shaft 186 in alinement therewith. The shaft 186 is constantly driven by bevel gears 188 and 190 from a cross shaft 192 driven by suitable reduction gearing from a motor 194. The one revolution clutch 184 is arranged to be operated by depression of a plunger 196 (Figure 1), which is arranged in a convenient position adjacent the path of the operator as he moves from the quenching tank 14 to the furnace 12. The shafts are inserted into and removed from the quenching tank 14 through adjacent funnels 198, which are shown as being constantly open, this being permissible without undue loss, since the water in the tank is not quite boiling.

The water in the quenching tank 14 and in the supply tank 176 is maintained at a constant temperature by either adding cold water through a supply pipe 200 or steam water through a supply pipe 202 arranged to discharge through openings in a longitudinally arranged feed pipe 204 inside of the supply tank 176. The addition of cold water is controlled by a valve 206 and the addition of steam is controlled by a valve 208, each of these valves being operated by one of two compressed air cylinders and pistons 210. One of the cylinders and pistons 210 is arranged to open its valve when the compressed air is admitted and the other one is arranged to close its valve when the compressed air is admitted, and both of them are operated by air from a conduit 212 connected to a supply conduit 214 through an air valve 216 controlled by a Powers type thermostat 218 in the supply tank 176. In the arrangement shown, an air gage 220 shows the pressure in the supply line 214 and the pressure in the conduit 212 is shown on a gage 222. When the water in the tank 176 is at the desired constant temperature both of the valves 208 and 206 are closed. If the water drops slightly in temperature, the thermostat 218 operates the air valve 216 to open the valve 208 to admit more steam; when, on the other hand, the temperature rises above the desired constant temperature, the thermostat 218 operates the valve 216 to open the valve 206 to admit more cold water. Since therefore, water is occasionally being added to the system, an overflow 224 is provided through which excess water returning to the supply tank 176 from the quenching tank 114 through the pipe 166 may run off.

*The turret 16.*—The turret 16 comprises upper and lower cross arms carried by a hollow central shaft 230 arranged to be moved by a radially-extending arm 231. If the turret is to be driven by power, arm 231 may control a cone clutch 232 operated by a gear 234 constantly driven by a small gear 236 on a vertical shaft 238 driven by bevel gears 240 from shaft 192. The cone clutch 232 is normally held in its disengaged position by springs 242 and is engaged to drive the turret only as long as the operator bears down on the handle 231, which is arranged conveniently at his side as he follows the turret 16 around the platform 24.

At each end of the turret is an air cylinder 246 in which is arranged a double acting piston carrying a connecting rod 248 arranged to raise and lower the shafts S. Air is admitted to the bottom or top of the cylinder 246 through air conduits 250 controlled by a two-way valve 252 operated by a lever 254 arranged in a convenient position, just above the operator's head. Air is supplied from connections 255 through the hollow shaft 230. Each shaft is arranged to be grasped by novel tongs or a pair of jaws 256, further described below, and which are supported at the bottom of the connecting rod 248 and which are opened and closed by a piston and cylinder 258 operated by air passing through flexible conduits 260 from the conduit 259, and controlled by a valve 262 arranged to be opened and closed by the operator's finger engaging a finger piece 264, as he turns the lever 254 up and down to control the raising and lowering of the tongs. Valve 262 is so arranged that there is a constant light pressure on the left of the piston (Figure 5) to serve the same general purpose as a return spring, while at the proper times the full pressure on the head of the piston closes the jaws firmly.

The power cylinder described above is pivotally mounted on the right hand jaw member, and the piston is positively connected to the left hand jaw member by a pair of connecting rods 274 straddling the rod 248. In order to make sure that the jaws open and close equally, and to assist in opening and closing them, they carry respectively pairs of plates containing oppositely-inclined cam slots 276 and 278, all four of which slots embrace pins 280 on links 282 carried by a block 284 secured, by a setscrew or otherwise, to rod 248. The jaws, which are pivotally connected at 286, contain semi-sleeve lugs 288 engaging the top of a compression spring 290 confined between the lugs and a stop 292 on rod 248. The bottom parts of the jaws are beveled or conical, as shown at 294, to guide them over the end of a shaft which is to be picked up.

Normally the jaws 256 are held in open position by the constant light pressure acting upon the left of the piston 258 as shown in Figure 5. This pressure operates to draw the upper ends of the tongs together, the inclination of the slots 276 and 278 causing a component of this pressure to act upon the pins 280, which are relatively fixed, to lift the tongs upwardly on the rod 248. This lifting action is assisted by the spring 290 and may be further assisted by resting the lower ends of the tongs upon a support. With the jaws open, pins 280 occupy the lower ends of the slots 276 and 278. When the tongs have been inserted over the head of the axle S, as shown in Figure 5, pressure is applied to the right side of the piston 258 overcoming the constant pressure on the left side of the piston and causing the upper ends of the tongs to separate and the lower ends to grip the axle. A part of the pressure on the piston is converted by the inclination of the slots into a force urging the tongs downwardly on the rod 248, this force being aided by the weight of the tongs and of the axle which they grip and producing compression of the spring 290.

Shafts are supplied the operator by an assistant who places them in the holder 266 (Figures 1 and 5), having a tubular bottom and a flaring or conical top to center the jaws or tongs 256 on the shaft. After the shafts have been treated in the hardening furnace, the quenching tank, and the drawing furnace, the operator places them in a cylindrical holder 268 for removal by his assistant. The holder 268 is kept full of water to a level determined by an overflow pipe 270, to cool the shafts down to a temperature at which they can be handled conveniently.

*Operation.*—The operator stands on the platform 24 beside one end of the turret 16, or two operators may work at the same time, one at each end of the turret 16. The operator at the right in Figure 1 grasps the lever 254 which controls the raising and lowering of the jaws 256, with his forefinger adjacent the finger piece 260 which controls the opening and closing of the jaws. He first lowers the jaws 256 and causes them to close on a shaft S in the holder 266, as shown in Figure 5, whereupon the jaws are raised to the position shown in Figure 3. One of the operators now depresses the handle 231, if the turret is power-driven, or pushes on the handle himself, to cause the turret to turn in counterclockwise direction (Figure 1) until the shaft S is immediately above the charging opening 106 of the hardening furnace, whereupon the operator steps on the pedal 146 to move the cover 110 from above the opening 106, and manipulates the tongs 256 to lower the shaft S into one of the carriers 102 of the turret of the hardening furnace and release it there. He then raises the jaws 256 out of the furnace, steps on the pedal 148 to uncover the discharging opening 108, through which he removes a hardened shaft which has made the circuit of the furnace 10 in the turret 50. As the operator leaves the furnace 10 he depresses one of the plungers 98 of the switch 88 to cause the turret 50 to be turned ready for the next operation, while at the same time the counter weight 120 pulls the cover 110 back over the opening 108 into its neutral position. The operator next stops the turret above the quenching tank 14, depositing in one of the holders 158 the hot hardened shaft which he has just removed from the hardening furnace, and removing through the other funnel 198 a shaft which has been around the quenching tank 14 and been cooled thereby. As the operator leaves the quenching tank 14 he steps on the plunger 196 to cause the turret in the quenching tank to be moved forward 60°.

The operator now deposits the cooled shaft, which he took from the quenching tank 14, in one of the carriers 102 of the turret 50 of the drawing tank 12 through the charging opening 106, and immediately thereafter removes through the discharging opening 108 a shaft which has just completed the circuit of the drawing furnace, which latter shaft he then deposits in the water cooled holder 268 for removal by his assistant.

It will be seen that the turret 16 is so arranged that two operators can conveniently work at once, each carrying the shafts through the same cycle but one of the operators being constantly 180° behind the other. That is, while the first operator is inserting a new shaft through the opening 106 of the hardening furnace 10, the second operator will be inserting a quenched shaft through the opening 106 of the drawing furnace 12; while the first operator is removing a hardened shaft through the opening 108 of the furnace 10, the second operator will be removing a drawn shaft through the opening 108 of the furnace 12; while the first operator is depositing his hardened shaft through one of the funnels 198 in the quenching tank 14, the second operator will be depositing his drawn shaft in the holder 268; and while the first operator is removing a quenched shaft through the second funnel 198, the second operator will be picking up a new shaft from the holder 266.

On the other hand, the apparatus is designed so that one operator can use it if desired, without doubling the time each shaft spends in the furnaces, by depressing both of the plungers 98 of the switch 88 as he leaves the furnace 10 and also as he leaves the furnace 12 so that he only uses every other one of the carriers of the two turrets 50. Thus the shafts may be in the furnaces the same length of time whether one or two operators are at work. As it does not make any particular difference how long a shaft stays in the quenching tank 14, after it has been cooled off, it has not been considered necessary to provide such a duplex starting and stopping mechanism for the turret in the quenching tank.

While one illustrative embodiment of the invention has been described in detail, it is not the intention to limit its scope to that particular embodiment, or otherwise than by the terms of the appended claims. The term "shaft," as used herein, is used as a convenient generic designation including analagous articles such as gun barrels, etc.

We claim:

1. Shaft treating apparatus comprising, in combination, a hardening furnace including a turret carrying a succession of shafts, a quenching tank, a drawing furnace including a turret carrying a succession of shafts, and a conveyor for placing an untreated shaft on a turret of the hardening furnace and removing a hardened shaft therefrom and placing it in the quenching tank, then removing a quenched shaft from the tank and placing it on the turret of the drawing furnace, and for finally removing a drawn shaft from the turret of the drawing furnace.

2. Shaft treating apparatus comprising, in combination, a hardening furnace constructed and arranged to hold a considerable number of shafts, a quenching tank having a turret holding a plurality of shafts, a drawing furnace constructed and arranged to hold a considerable number of shafts, and an operator-controlled conveyor for placing an untreated shaft in the hardening furnace and removing a hardened shaft therefrom, then placing the hardened shaft on the turret of the quenching tank and removing a quenched shaft from the turret, and finally placing the quenched shaft in the drawing furnace and removing a drawn shaft therefrom.

3. Shaft treating apparatus comprising, in combination, a hardening furnace, a quenching tank, and a drawing furnace, each of said furnaces and the tank having a charging opening and a discharging opening in its upper surface, means associated with each of said furnaces and the tank to receive a shaft at the charging opening and to carry it to a position where it may be removed through the discharging opening, all of said charging and discharging openings being arranged substantially on the circumference of a circle, and an angularly-movable conveyor arranged to be controlled by an operator and having a shaft carrying device movable along the circumference of said circle.

4. Shaft treating apparatus comprising, in combination, a turret hardening furnace, a turret quenching tank, a turret drawing furnace, all spaced angularly about a central axis, and a conveyor rotating about said central axis and arranged to be controlled by an operator, said conveyor including power operated tongs for grasping a shaft and power operated means for raising and lowering the tongs.

5. Shaft treating apparatus comprising, in combination, a turret hardening furnace, a turret quenching tank, a turret drawing furnace, an operator-controlled conveyor movable in a circular path to transfer shafts successively to the hardening furnace, the quenching tank, and the drawing furnace, and stopping and starting devices for the hardening furnace, the quenching tank, and the drawing furnace, respectively, arranged for convenient manipulation by the operator as he leaves the furnace or tank with which they are associated.

6. The combination of a heat treating furnace, a conveyor in said furnace for receiving articles and carrying them in a continuous passage through said furnace, a quenching tank, means for conveying articles through said tank, and operator controlled devices arranged to successively load said first named conveyor with an untreated article, remove a treated article therefrom, place the treated article in said quenching tank conveyor and remove a quenched article therefrom.

7. The combination as defined by claim 6, operator controlled automatic devices for effecting step by step movement of said conveyors following the charging and discharging operations.

8. The combination as defined by claim 6, operator controlled automatic devices for selectively effecting varying movement of one of said conveying devices.

9. The combination of a heat treating furnace, a conveyor in said furnace for receiving articles and carying them in a continuous passage through said furnace, a quenching tank, means for conveying articles in a continuous passage through said tank, said furnace and tank being provided with passages affording access to the interior thereof for placing articles therein and removing articles therefrom, said passages being arranged on the arc of a circle, and a rotatable operator controlled conveying device for successively supplying said furnace with untreated articles, removing treated articles therefrom, placing the treated articles in the quenching tank and removing the quenched articles therefrom.

10. The combination as defined by claim 9, and a drawing furnace associated with said devices and provided with a conveyor adapted to convey articles in a continuous passage through said furnace, said furnace being provided with openings for the insertion and removal of articles, said openings being arranged along the same arc, and said rotatable conveyor being adapted to place quenched articles from said tank in said drawing furnace conveyor and remove drawn articles therefrom.

In testimony whereof we affix our signatures.

HARRY O. LANG.
JOHN McGEORGE.